N. A. KURMAN.
TELEPHONIC RECEIVER.
APPLICATION FILED OCT 10, 1917.
1,356,156. Patented Oct. 19, 1920.
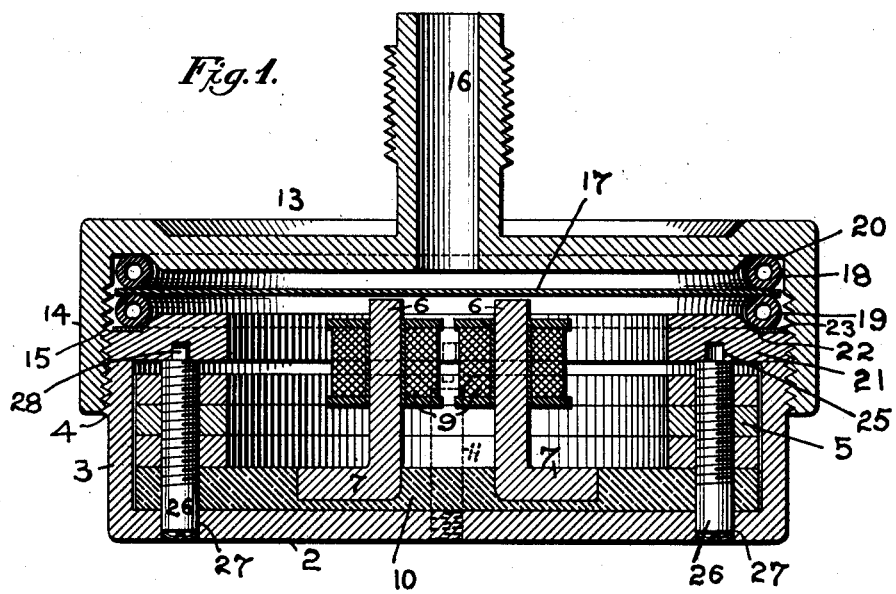
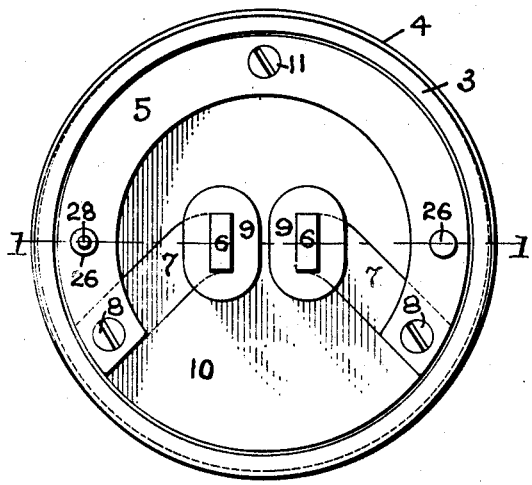 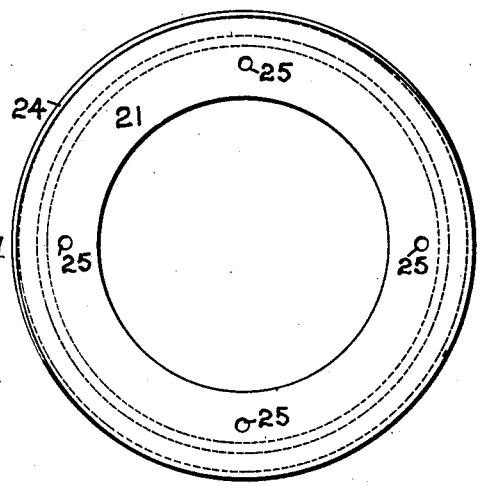
INVENTOR
Nathan A. Kurman
WITNESSES:
ATTORNEY

UNITED STATES PATENT OFFICE.

NATHAN A. KURMAN, OF NEW YORK, N. Y., ASSIGNOR TO INTERNATIONAL CALLOPHONE CORPORATION, A CORPORATION OF DELAWARE.

TELEPHONIC RECEIVER.

1,356,156.  Specification of Letters Patent.  Patented Oct. 19, 1920.

Application filed October 10, 1917. Serial No. 195,688.

*To all whom it may concern:*

Be it known that I, NATHAN A. KURMAN, a citizen of the United States, and resident of New York city, county of New York, and State of New York, have invented an Improvement in Telephonic Receivers, of which the following is a specification.

My invention has particular reference to receivers for use in the art of electrical transmission of sound vibrations such as utilized in telephonic communication, and more especially to that class of receivers in which the diaphragm is mounted within a case between resilient cushions adjacent its perimeter and vibrated under the influence of a varying magnetic field produced by an electro-magnet whose poles are arranged relatively close to the central portion of the diaphragm. In the best forms of this type of receiver, the resilient cushions offer but small resistance against vibratory movements to the diaphragm produced under the influence of the electro-magnetic field, whereby small, if any, reverse bending of the diaphragm is required. Considerable difficulty has, however, been found in adjusting the magnet poles to the diaphragm, to insure the most satisfactory and effective results.

The principal objects of my invention are to provide, in a receiver of the general type aforesaid, means for adjusting the receiver so as to obtain a correct tension of the cushions in association with the diaphragm and to vary the air-gap betwen the diaphragm and pole pieces, said adjustments being adapted to be performed separately or together.

My object is further, to provide such means for adjusting the cushion tension and the extent of air-gap between the diaphragm and pole pieces, that the adjustments of either or both may be accomplished while the instrument is in use in reproducing articulate sounds, whereby it is possible to readily ascertain the efficiency peak both in respect to clearness of enunciation and loudness of reproduction.

My invention also consists of improvements hereinafter described whereby the above objects and results are attained, said improvements comprising certain organization and combination of parts which are fully described hereinafter and more particularly defined in the claims.

For the purpose of illustrating my invention, I have shown in the accompanying drawings the embodiment thereof which is at present preferred by me, since the same is in form to give satisfactory and reliable results, but it is to be understood that the several instrumentalities of which my invention consists, can be variously arranged and organized and that my invention is not limited to the precise arrangement and organization of the instrumentalities herein shown and described.

Referring to the drawings:—Figure 1 is a cross sectional view of my improved receiver on a plane diametrically across the same; Fig. 2 is a plan view of the rear case and electro-magnet, removed from the diaphragm portion; and Fig. 3 is a plan view of the supporting and adjusting ring for the cushions.

2 is the circular magnet containing body or rear casing, having the annular wall 3 provided with external screw threads 4. Within this body or rear casing 2, is arranged the electro-magnet which comprises horse-shoe permanent magnet sections 5 arranged upon each other and having secured to their polar ends, the pole pieces 6, 6, each of which consists of a flat bar bent at right angles to provide radial portions 7, which portions extend to and are fastened by screws 8 to the polar ends of the magnet sections 5. As shown, the radial portions 7, 7, of the pole pieces extend below and overlap the polar ends of the magnets 5, while the pole pieces 6, 6, extend parallel and approximately axially of the said permanent magnets. Furthermore, each of the pole pieces 6, 6, is provided with a spool containing a suitable wire winding or helix, as is customary to provide the field variations necessary to induce vibration of the diaphragm 17.

The magnet structure above described is secured in position within the body or rear casing 2, by securing it upon a hard rubber or other dielectric insulating disk 10, the latter being arranged between the magnet and the bottom of the body portion 2 and the whole secured therein by one or more screws 11. By this construction, the entire magnet-structure may be removed from the body while retaining the association of its correlated parts.

13 is a cap or front casing, having a central sound tube 16 and an annular flange 14 internally screw threaded at 15 so as to be adapted to the threaded portion 4 of the body flange 3. The cap 13 on its inner side is provided with an annular groove 20 in which is arranged an annular rubber cushion 18. The groove portion 20 enables the cushion to be formed of a piece of light rubber tubing bent into a ring form with its ends abutting and positioned in the groove. The diaphragm 17 rests upon the annular rubber cushion, and by reason of said cushion being positioned in the groove 20, the air space between the diaphragm and the inner wall surface of the cap 13 is reduced to a practical minimum, whereby a small vibration of the diaphragm will be effective in causing sufficient air vibrations through the sound tube or passage 16 to insure loud articulation. Upon the opposite side of the diaphragm 17 is arranged a second annular rubber cushion 19 of the same general construction as the cushion 18. This second cushion 19 is held up to the diaphragm 17 by a light annular plate 23 and a cushion clamp ring or bushing 21, whose perimeter is screw threaded and screwed into the internal screw threads 15 of the cap flange 14. This cushion clamp 21 is preferably open at its center to provide clear space between the diaphragm 17 and the bottom of the body or rear casing, so as to give a large cubical chamber to prevent interference with the induced vibrations of the diaphragm under the variable magnetic field, and also to permit rotation of the magnets relatively thereto. The annular plate 23 rests in an annular groove 22 in the cushion clamp 21, and while pressing upon the rubber cushion 19, permits the cushion clamp to be rotated (to provide the desired adjustment to insure the preferable cushion resiliency upon the diaphragm), without objectionable drag upon the cushion. When in proper adjustment, the pole pieces 6, 6, are close to the magnetic diaphragm, as shown.

By means of the adjustable cushion clamp 21, it is possible to adjust the diaphragm 17 nearer to or farther from the pole pieces 6, 6; and simultaneously therewith, to vary the resiliency of the supporting cushions 18 and 19 commensurately with the changes in mean field strength caused by the changes in distance between the diaphragm and pole pieces.

I will now describe the means for effecting the adjustment: The cushion clamp has upon its rear surface a plurality (preferably four) of equally spaced recesses 25, with either of which engagement may be made by the stud 28 of the adjusting screw 26. This adjusting screw 26 extends through a hole 27 in the back of the body 2 and is screwed through a threaded hole in the magnets 5. The upper end of the screw about the stud 28 may be made flat so as to press against the cushion clamp to hold it in adjusted position. If desired, an additional screw 26 may be similarly used at the other side of the magnet and cushion clamp, but this one does not have the stud 28. By employing two such screws for clamping the several parts 2 and 21 against displacement after adjustment, a better result is obtained, as the strains are balanced and more accurate positioning of the parts assured. In adjusting the parts, the screws 26 are slightly screwed away from the cushion clamp 21, but with the stud 28 engaging one of the holes or recesses 25. The body or rear casing 2 is then rotated and thereby rotates the cushion clamp 21 to put more or less pressure upon the cushions 18 and 19; and in making this adjustment the clamp 21 slides in contact with the ring 23 which rests upon the rubber cushion 19. In making this adjustment the cushions 18 and 19 will be simultaneously adjusted as to resiliency and at the same time the pole pieces 6, 6, will be correspondingly adjusted closer to the diaphragm 17 with an increased compression on the cushions, and vice versa. If the adjustment is what is desired, the screws 26 may be tightened to clamp all parts against displacement. But if it is desired to change the extent of air-gap between the diaphragm and the poles 6, 6, the screws 26 are screwed back out of contact with the cushion clamp and then the body or rear casing 2 is separately turned to position the poles 6, 6, to decrease or increase the air-gap as required; after which the screws are tightened.

Unless the diaphragm is mounted in correct position commensurate with its thickness, delicacy of the cushions and of the magnet strength, the mounting as a whole will not respond to all magnetic field variations corresponding to sound vibrations; and therefore, the provisions for the complete adjustment of all coacting parts is most important where an efficient receiver is required. It is a matter of extreme difficulty in a receiver of this kind to mechanically gage the exact point of correct tension between the diaphragm cushions, and as such adjustments may be made in my improved receiver while in use, the accuracy and speed of adjustment may be assured.

In a receiver of the ordinary type, which has its diaphragm held between non-yielding clamps, it is easy to ascertain, within the limit of the expansion coefficient, the proper air-gap between the diaphragm and pole pieces. But in a receiver such as here described, it is mechanically impossible to gage the adjustment, as there are so many variables to contend with. It is practically impossible to continuously obtain the rubber tubing (from which the cushions are made) without characteristic variations as to resiliency. The nature of rubber and conditions that surround the manufacture of tubing, preclude the possibility of obtaining tubing of constant gage, resiliency, compressibility, and wall-thickness. There is again, the difficulty, owing to the above conditions, of obtaining the proper air-gap between the pole pieces and diaphragm. If one cushion be cut from a piece of tubing that is older than that of the other cushion, the compression factor will cause a difference in the air-gap and also affect the results of the sound condensing chamber. Other variables have to be compensated for in the adjustment, and one of these is the magnetic variable. Some magnets are stronger than others, and with age lose a varying magnetic percentage; and in any case there is a greater mechanical stress upon the cushion nearest the pole pieces than upon the other. Also, in those cases where the front and back are screwed tightly together and in so doing clamp the diaphragm between cushions, said cushions are wrinkled and distorted with objectionable results in the operation of the diaphragm, but by the provision which I make, the cushions are brought to the desired degree of compression without any dragging surfaces acting upon them; in fact, all adjustments are easily made without objectionable manipulation of the cushions, the pressure variations being directed at right angles to the plane of the diaphragm and cushions, this being possible by the employment of the metal ring 23 which does not turn when adjusting the cushion clamp 21.

By the construction employed in my improved receiver, the above mentioned variables are rendered negligible and it is an easy matter to find the efficiency peak of the diaphragm tension of each individual unit, and also the proper relation to the air-gap between the pole pieces and diaphragm, or vice versa.

In a receiver of this character where loud action with clear enunciation is required, it is important to hold the diaphragm very lightly between the cushions and permit it to bodily vibrate with as little self-distortion as possible and to accomplish these results it is practically essential that the capacity for adjustments of the cushion tension and air-gap be provided, so that not only may the highest efficiency be secured, but each receiver may be quickly adjusted to suit its own requirements and this too while in actual use.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details, as the same are susceptible of modification in various particulars without departing from the spirit or scope of the invention.

Having now described my invention, what I claim as new and desire to secure by Letters Patent, is:—

1. In a telephonic receiver, the combination of a suitable casing, a diaphragm, a pair of resilient annular cushions within the casing and supporting the diaphragm between them, an electromagnet having its pole pieces arranged close to the diaphragm, and adjusting devices for simultaneously varying the tension of the resilient cushions and shifting the diaphragm relatively to the pole pieces to change the air-gap, said adjusting devices carried by but adjustable relatively to the inclosing casing.

2. In a telephonic receiver, the combination of a suitable casing, a diaphragm, a pair of resilient annular cushions within the casing and supporting the diaphragm between them, an electromagnet having its pole pieces arranged close to the diaphragm, adjusting devices for simultaneously varying the tension of the resilient cushions and shifting the diaphragm relatively to the pole pieces to change the air-gap, and means for locking the parts in fixed relation when adjusted.

3. In a telephonic receiver, the combination of a suitable casing, a diaphragm, a pair of resilient annular cushions within the casing and supporting the diaphragm between them, an electromagnet having its pole pieces arranged close to the diaphragm, adjusting devices for simultaneously varying the tension of the resilient cushions and shifting the diaphragm relatively to the pole pieces to change the air-gap, and additional means for adjusting the pole pieces to or from the diaphragm to increase or decrease the air-gap.

4. In a telephonic receiver, the combination of a suitable casing, a diaphragm, a pair of resilient annular cushions within the casing and supporting the diaphragm between them, an electromagnet having its pole pieces arranged close to the diaphragm, adjusting devices for simultaneously varying the tension of the resilient cushions and shifting the diaphragm relatively to the pole pieces to change the air-gap, additional means for adjusting the pole pieces to or from the diaphragm to increase or decrease the air-gap, and means for locking the parts in adjusted positions.

5. In a telephonic receiver, the combination of a suitable casing, a diaphragm, a pair of resilient annular cushions within the casing and supporting the diaphragm between them, an electro-magnet having its pole pieces arranged close to the diaphragm, a cushion clamp screwed into the casing and applying pressure upon the resilient cushions to simultaneously vary their resiliency, additional means to adjust the magnet poles to vary the air-gap between the pole pieces and diaphragm, and connecting devices for operating the cushion clamp from the adjusting means which are employed in adjusting the air-gap.

6. In a telephone receiver, a case, a diaphragm and two very resilient cushions about its peripheral portion and between which the diaphragm is free to vibrate bodily with small resistance, combined with an electro-magnet for producing a magnetic field in the vicinity of the central portion of the diaphragm, means in addition to the inclosing case and adjustable therein for adjusting the resiliency of the diaphragm cushions, and means for independently adjusting the pole pieces of the electro-magnet to or from the diaphragm without disturbing the tensions of the cushions.

7. In a telephone receiver, a case having front and rear portions movably connected, a diaphragm and two very resilient cushions about its peripheral portion and between which the diaphragm is free to vibrate with small resistance, combined with an electro-magnet for producing a magnetic field in the vicinity of the central portion of the diaphragm, means comprising a cushion clamp screwed into the case and pressing upon one of the cushions for adjusting the resiliency of the diaphragm cushions, and means carried by the rear portion of the case and engaging the cushion clamp whereby it may be rotated to vary the elasticity of the cushions when the rear portion of the case is rotated, the case remaining closed during adjustment.

8. In a telephone receiver, a case, a diaphragm and two very resilient cushions about its peripheral portion and between which the diaphragm is free to vibrate with small resistance, combined with an electro-magnet for producing a magnetic field in the vicinity of the central portion of the diaphragm, means comprising a cushion clamp screwed into the case and pressing upon one of the cushions for adjusting the resiliency of the diaphragm cushions, an adjustable portion of the case movable to and from the cushion clamp for independently adjusting the pole piece of the electro-magnet to or from the diaphragm, and an adjustable coupling connection between the adjustable portion of the case and the cushion clamp.

9. In a telephone receiver, a case, a diaphragm and two very resilient cushions about its peripheral portion and between which the diaphragm is free to vibrate with small resistance, combined with an electro-magnet for producing a magnetic field in the vicinity of the central portion of the diaphragm, means comprising a cushion clamp screwed into the case and pressing upon one of the cushions for adjusting the resiliency of the diaphragm cushions, an adjustable portion of the case movable to and from the cushion clamp for independently adjusting the pole piece of the electro-magnet to or from the diaphragm, and a screw extending through the adjustable portion of the case for pressing upon the cushion clamp for locking it and the case in fixed relation.

10. In a telephone receiver, a case, a diaphragm and two very resilient cushions about its peripheral portion and between which the diaphragm is free to vibrate with small resistance, combined with an electro-magnet for producing a magnetic field in the vicinity of the central portion of the diaphragm, means comprising an annular cushion clamp screwed into the case and having a recess upon one side and its other side pressing upon one of the cushions to compress them to vary their resiliency, an adjustable portion of the case screwed to the case portion in which the cushion clamp is screwed, said adjustable portion carrying the electro-magnet, a screw extending through the adjustable case portion and having a part adapted to engage the recess of the cushion clamp for rotating it when the adjustable case portion is rotated and also for permitting the adjustable case portion to be rigidly clamped to the cushion clamp and the remaining portion of the case for holding said parts in rigid relation when adjusted.

11. In a telephone receiver, a case, a diaphragm and two very resilient cushions about its peripheral portion and between which the diaphragm is free to bodily vibrate with small resistance, combined with an electro-magnet for producing a magnetic field in the vicinity of the central portion of the diaphragm, means carried by the case for adjusting the resiliency of the cushions and shifting the diaphragm relatively to the wall of the case to vary the air chamber space, and separate means for adjusting the pole piece of the electro-magnet relatively to the diaphragm to compensate for the adjusted change in position of the diaphragm in the case.

12. In a telephonic receiver, the combination of a casing comprising a rear body and a cap having a sound tube and adjustably screwed together to vary the interior depth of the inclosed space, a diaphragm in the cap portion, annular rubber cushions of great resiliency on each side of the diaphragm adjacent to its perimeter and permitting bodily movement of the diaphragm, means to adjustably clamp the cushions in position to the cap, an electro-magnet comprising a permanent magnet of horse-shoe shape, secured to the rear body of the casing and having pole pieces extending adjacent to the diaphragm, and a flat hard disk shaped dielectric body between the magnet and the rear body portion of the casing and grooved to receive the pole pieces intermediate of the poles and permanent magnets.

13. In a telephonic receiver, the combination of a casing compressing a rear body and a cap having a sound tube and adjustably screwed together to vary the interior depth of the inclosed space, a diaphragm in the cap portion, annular rubber cushions of great resiliency on each side of the diaphragm adjacent to its perimeter, means to adjustably clamp the cushions in position in the cap, an electro-magnet secured to the rear body and having pole pieces adjacent to the diaphragm, a dielectric support between the magnet and the rear body portion of the casing, and screws extending through the rear body and magnet portions and engaging the means for clamping the cushions whereby said means may be adjusted and clamped to the rear body and cap portions.

In testimony of which invention, I hereunto set my hand.

NATHAN A. KURMAN.

Witnesses:
ARTHUR J. RICHINS,
RUDOLPH KRAEMER.